(12) United States Patent
Safir

(10) Patent No.: US 11,993,398 B2
(45) Date of Patent: May 28, 2024

(54) LUGGAGE INSPECTION APPARATUS

(71) Applicant: SELFCAIR UK LTD., Wisbech (GB)

(72) Inventor: André Safir, Rueil-Malmaison (FR)

(*) Notice: Subject to any disclaimer, the term of this patent is extended or adjusted under 35 U.S.C. 154(b) by 234 days.

(21) Appl. No.: 17/634,330

(22) PCT Filed: Aug. 13, 2020

(86) PCT No.: PCT/FR2020/051463
§ 371 (c)(1),
(2) Date: Aug. 10, 2022

(87) PCT Pub. No.: WO2021/032921
PCT Pub. Date: Feb. 25, 2021

(65) Prior Publication Data
US 2022/0371747 A1    Nov. 24, 2022

(51) Int. Cl.
*B64F 1/36* (2024.01)
*G01V 8/20* (2006.01)
*G08B 21/18* (2006.01)

(52) U.S. Cl.
CPC .......... *B64F 1/368* (2013.01); *G01V 8/20* (2013.01); *G08B 21/182* (2013.01)

(58) Field of Classification Search
CPC .......... B64F 1/368; G01V 8/20; G08B 21/182
USPC ...................................................... 340/568.1
See application file for complete search history.

(56) References Cited

U.S. PATENT DOCUMENTS

| | | | |
|---|---|---|---|
| 3,473,762 A | 10/1969 | Platt | |
| 4,634,849 A * | 1/1987 | Klingen | B07C 5/3412 235/487 |
| 7,183,916 B2 * | 2/2007 | Romeres | B64F 1/368 340/572.1 |
| 8,328,035 B2 * | 12/2012 | Safir | B65D 90/0073 220/23.88 |
| 9,617,756 B2 * | 4/2017 | Safir | G06K 7/10009 |

(Continued)

FOREIGN PATENT DOCUMENTS

| | | |
|---|---|---|
| EP | 2 772 440 A1 | 9/2014 |
| EP | 3 024 731 A1 | 6/2016 |

(Continued)

OTHER PUBLICATIONS

International Search Report for corresponding International Application No. PCT/FR2020/051463 dated Nov. 20, 2020.

(Continued)

*Primary Examiner* — Zhen Y Wu
(74) *Attorney, Agent, or Firm* — Pearne & Gordon LLP

(57) ABSTRACT

The application concerns an apparatus for inspecting luggage, including a tubular frame having a plurality of pairs of lateral openings, the tubular frame being suitable for receiving a plurality of containers in line with the pairs of openings, each of the containers having two opposing faces and a plurality of juxtaposed and superimposed locations that are freely accessible through the two opposing faces, each of the locations being suitable for receiving a piece of luggage provided with an information recording medium containing information relating to the piece of luggage. The apparatus further includes a locating device including photoelectric detection grids installed across the lateral openings, respectively, and the position of the location in the container is recorded when the photoelectric detection grid is crossed.

10 Claims, 4 Drawing Sheets

(56) References Cited

U.S. PATENT DOCUMENTS

| | | | | |
|---|---|---|---|---|
| 9,919,811 B2* | 3/2018 | Dinkelmann | ...... | G06Q 10/0832 |
| 2005/0192701 A1* | 9/2005 | Ben-Ezra | ...... | G06K 17/00 |
| | | | | 700/226 |
| 2006/0022090 A1* | 2/2006 | McCoskey | ...... | B64F 1/31 |
| | | | | 244/137.1 |
| 2006/0267782 A1* | 11/2006 | Stavoe | ...... | G01V 3/08 |
| | | | | 340/568.1 |
| 2007/0089330 A1* | 4/2007 | Lehmann | ...... | G06Q 10/06 |
| | | | | 40/6 |
| 2008/0257949 A1* | 10/2008 | Hills | ...... | G06Q 10/08 |
| | | | | 235/375 |
| 2009/0091452 A1* | 4/2009 | Himmel | ...... | G06Q 10/06 |
| | | | | 340/572.1 |
| 2012/0022684 A1* | 1/2012 | Hernot | ...... | B64F 1/368 |
| | | | | 700/225 |
| 2014/0241837 A1* | 8/2014 | Bartelet | ...... | B64F 1/366 |
| | | | | 414/277 |
| 2015/0186699 A1* | 7/2015 | Motley, III | ...... | G06K 7/10366 |
| | | | | 340/10.51 |
| 2016/0159498 A1* | 6/2016 | Safir | ...... | G06K 7/10009 |
| | | | | 700/214 |
| 2017/0068930 A1* | 3/2017 | Attar | ...... | G06K 19/07758 |
| 2017/0372105 A1* | 12/2017 | Coxall | ...... | G06K 7/10386 |
| 2018/0099751 A1* | 4/2018 | Murphy | ...... | B65G 1/10 |

FOREIGN PATENT DOCUMENTS

| | | |
|---|---|---|
| FR | 2 975 078 A1 | 11/2012 |
| WO | 2015/011426 A1 | 1/2015 |

OTHER PUBLICATIONS

Written Opinion for corresponding International Application No. PCT/FR2020/051463 dated Nov. 20, 2020.

French Search Report for corresponding French Application No. 1909231 dated Dec. 3, 2021.

* cited by examiner

LUGGAGE INSPECTION APPARATUS

CROSS-REFERENCE TO RELATED APPLICATIONS

This application is a national stage entry of International Application No. PCT/FR2020/051463 filed on Aug. 13, 2020, which claims the benefit of priority to French Application No. FR1909231, filed Aug. 16, 2019, the entire disclosures of which are hereby incorporated herein by reference.

The present invention relates to a luggage inspection installation in a transfer space.

One field of application that is considered is notably, but not exclusively, that of the luggage transfer inspection in an airport, between the recording of a piece of luggage by the passenger and the recovery of the same piece of luggage in another airport after the flight for example.

An effective processing of the inspection of luggage on the ground with a minimal number of personnel, makes it possible to reduce the unit transport costs.

Also, known luggage inspection installations make it possible to involve the passengers in the conveyance of their luggage. These installations comprise a tubular frame comprising a plurality of pairs of opposing lateral openings, and being able to accommodate a plurality of successive containers respectively in line with the pairs of lateral openings. The tubular frame has a closed end and an open end. It extends longitudinally in the airport so that the open end emerges outside, in a reserved zone prohibited to the public, to be able to receive the containers.

The containers extend generally on two or three levels and they have two opposing open faces and a plurality of juxtaposed and superposed locations that are freely accessible through the two faces. Also, their upper part is wider than their lower part to be able to conform to the hold of the airplanes.

When the containers are engaged successively in the tubular frame, the locations are then freely accessible through the lateral openings of the tubular frame.

Each passenger, after he or she has equipped his or her piece of luggage with an information recording medium including his or her identity and the flight references, and he or she has satisfied the required inspections, loads his or her piece of luggage in the location of one of the containers assigned to the flight. Also, a locating device makes it possible to record the position of the piece of luggage in the container, while a reading device makes it possible to simultaneously read the recording medium.

That way, the positions of the pieces of luggage in the containers and the identities of the owners are known.

The containers, thus loaded with luggage, are intended to be carried in the hold of the airplanes, then, at the destination, to be extracted therefrom to be able to be reinstalled, if appropriate, in other tubular frames according to an identical configuration. The passengers will then be able to retrieve their pieces of luggage at the destination and unload them from the containers.

Reference can be made to the document FR 2 975 078, which describes such a luggage inspection installation.

The locating device which is then implemented, a transceiver on the frame and an RFID tag on the pieces of luggage, is relatively complex.

So, one problem which arises and that the present invention aims to resolve is how to provide a luggage inspection installation which is simpler to implement.

To this end, a luggage inspection installation is proposed comprising, on the one hand, a tubular frame comprising a plurality of pairs of opposing lateral openings, said tubular frame being suitable for accommodating a plurality of successive containers respectively in line with the pairs of lateral openings, each of said containers having two opposing faces and a plurality of juxtaposed and superposed locations that are freely accessible through said two opposing faces, each of said locations being suitable for receiving a piece of luggage provided with an information recording medium containing information relating to said piece of luggage; and, on the other hand, a locating device and a reading device linked to a recording member to be able to record, for each of said locations of each container receiving a piece of luggage, the position of said location in said container and said information relating to said piece of luggage. Said locating device comprises photoelectric detection grids installed respectively across said lateral openings, and in that the position of said location in said container is recorded when the photoelectric detection grid is crossed opposite said location and said reading device reads said recording medium.

Thus, a feature of the invention lies in the implementation of photoelectric detection grids across the lateral openings of the tubular frames to be able to record the position and the identification of the pieces of luggage in each of the locations. These locations may or may not be compartmental. That way, no mechanical device is necessary to situate the piece of luggage when it is loaded by the passenger in the container. As will be explained in more detail hereinbelow in the description, the recording member forms part of a more complex inspection and control system.

Preferentially, said photoelectric detection grids comprise a plurality of first parallel electromagnetic beams and a plurality of second parallel electromagnetic beams crossed with the first beams. By virtue of the first electromagnetic beams crossed with the second beams, in the plane of each lateral opening, when a piece of luggage is introduced into the container, the passenger then cuts certain first beams and certain second beams in a portion of the plane situated opposite the location which accommodates said piece of luggage. The recording member thus records the position of the location inside the container corresponding to the interruption of said certain beams.

According to a particularly advantageous variant embodiment, the first electromagnetic beams extend vertically, whereas the second electromagnetic beams extend horizontally. Thus, for example, a first row of emitting cells is installed vertically in the left part of each of the lateral openings, and an opposite first row of receiving cells is installed vertically in the right part of each of said lateral openings. Also, a second row of emitting cells is installed horizontally in the top part of each of said lateral openings, and an opposite second row of receiving cells is installed horizontally in the bottom part of each of said lateral openings. The cells are, for example, spaced apart from one another on each of the rows by a distance of between 1 cm and 10 cm, for example 4 cm.

Furthermore, said reading device is mobile so as to be able to be carried, by said luggage carrier, opposite said recording medium of said piece of luggage to read said recording medium. Thus, the passenger or luggage carrier, deposits his or her piece of luggage in a location, and cuts the crossed beams situated opposite said location, not only with his or her piece of luggage but also with his or her hands and arms. When the piece of luggage is in place, he or she then takes hold of the reading device which is within reach so as to carry it specifically close to the recording medium there to read the information that it contains. Thus, either the arms and/or the hands of the carrier of the piece of luggage continually break the crossed beams, while he or she holds the reading device to read the information from the recording medium, and in which case the continuity of the interruption of the beams makes it possible to associate the position of the piece of luggage and of the location in the container with the reading of the information from the storage medium, or the arms and/or the hands of the luggage carrier have momentarily ceased interrupting the crossed beams to be able to take hold of the mobile reading device and carry it close to the storage medium of the piece of luggage, once again interrupting the crossed beams opposite the piece of luggage and the corresponding location, and then time parameters will have to be considered to be able to associate the reading of the recording medium with the corresponding piece of luggage. The abovementioned two protocols will be explained in more detail hereinafter in the description.

Moreover, it will be observed that two or even three passengers may wish to load their pieces of luggage simultaneously in the same container. So, to avoid errors of correlation between the recording of the information from the recording media and the respective positions of the locations, it is advantageous to have a single reading device available per lateral opening. In addition, it is necessary for the position of the intrusion of the reading device to be clearly identified to be able to associate therewith the position of the piece of luggage and of the location in the container. For this, and as will be explained in more detail hereinbelow in the description, particular protocols must be adopted as to the position of the interruption of the crossed beams, and the interruption times.

Preferentially, the reading device is an optical reader. Also, the recording medium associated with the piece of luggage supports coded information. For example, the information recording medium has a barcode or even a matrix code.

Furthermore, and particularly advantageously, said recording medium provokes the triggering of an alarm when it records just the crossing of the photoelectric detection grid opposite said location without recording said information relating to said piece of luggage. In other words, when a piece of luggage is engaged in a location by a passenger without the latter taking care to ensure the reading of the recording medium for the information regarding it to be communicated to the control inspection system, the installation sets off an alarm. Then, either it remedies this anomaly itself, and in which case the alarm ceases to operate, or an agent intervenes to check that it does not involve a deliberate malicious action.

Furthermore, said mobile reading device advantageously provokes the triggering of an alarm when said recording medium records said information relating to said piece of luggage before recording the crossing of the photoelectric detection grid. That way, there is an assurance that the passenger has indeed loaded his or her piece of luggage in the container.

Moreover, and according to one particularly advantageous implementation of the invention, said recording member comprises a prerecorded list of the information relating to all the pieces of luggage, and said recording member compares the information relating to each piece of luggage received in each of the locations with the information relating to the pieces of luggage of said prerecorded list. The prerecorded list of the information relating to the pieces of luggage, comprising the flight references and the identity of the luggage carrier is automatically established upstream of the installation during the first phases of recording and inspection thereof, and it is automatically transmitted to the installation. In other words, the recording member correlates the information relating to the pieces of luggage with the prerecorded data in a database. The inspection and control system of the installation then triggers an alarm when the information relating to the piece of luggage does not appear in the prerecorded list of the database. That way, there is an assurance that all the pieces of luggage deposited in the locations of the containers have indeed been the subject of a prior recording.

Other particular features and advantages of the invention will emerge on reading the following description of particular embodiments of the invention, given for information but in a nonlimiting manner, with reference to the attached drawings in which.

Figure 1:
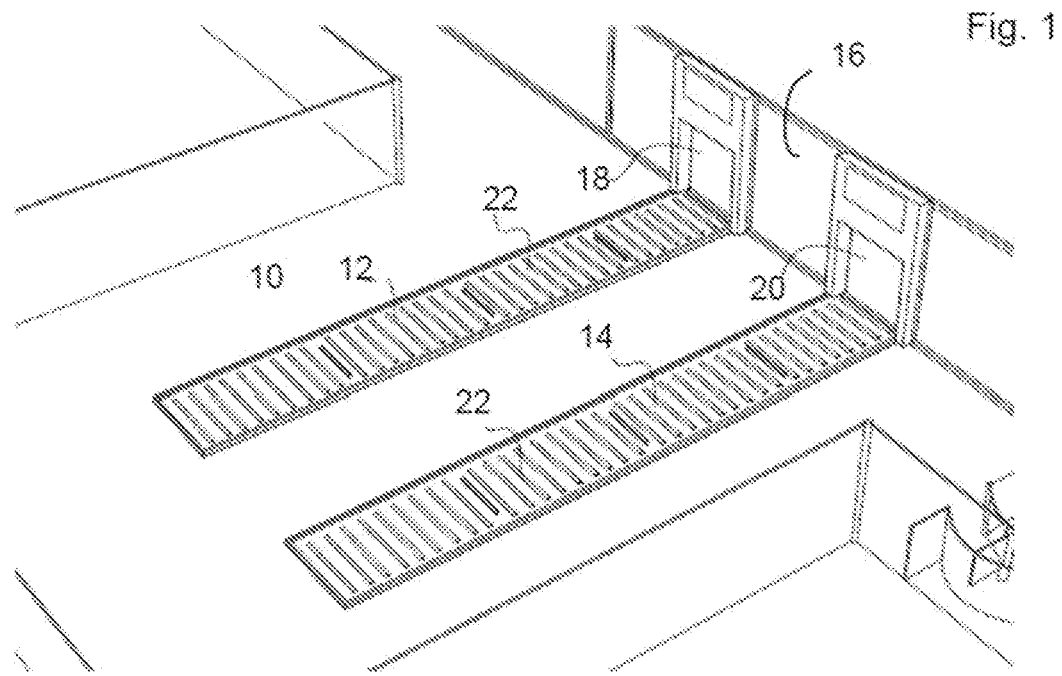
FIG. 1 is a perspective schematic view of a part of an airport capable of receiving the subject of the invention.

FIG. 1 schematically shows a part 10 of an airport having two longitudinal storage spaces 12, 14 around which passengers can move around. The two longitudinal storage spaces 12, 14 here extend longitudinally and parallel to one another, to a routing wall 16 pierced with two openings 18, 20 respectively in the extension of the storage spaces 12, 14. Also, the longitudinal storage spaces 12, 14 are respectively equipped with rolling cylinders 22 installed transversely substantially equidistant from and parallel to one another. Furthermore, of the rolling cylinders 22, some are motor cylinders. Preferentially, the rolling cylinders 22 installed in line with the openings 18, 20 are motor cylinders for reasons that will be explained hereinbelow.

Figure 2:
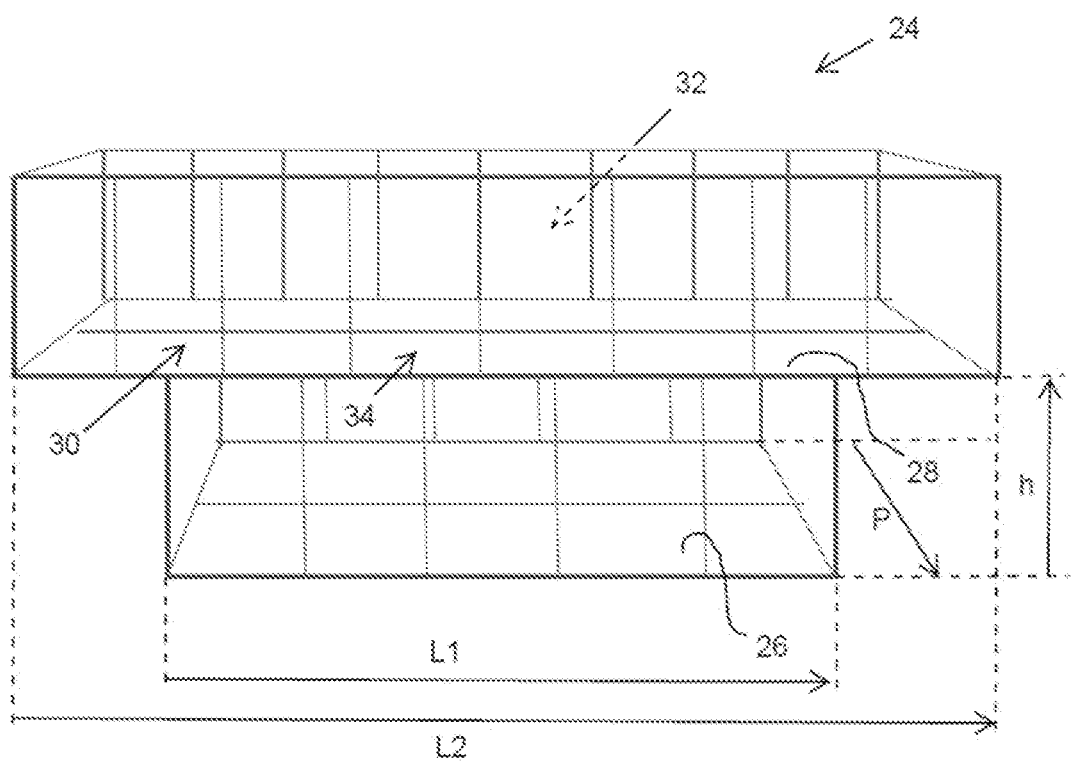
FIG. 2 is a perspective schematic view of a luggage loading element.

There now follows a description with reference to FIG. 2 of a container 24, intended specifically to be driven over the abovementioned longitudinal storage spaces 12, 14. It has two superposed loading platforms, a lower platform 26 and a wider upper platform 28. The container 24 is of generally tubular form and it has two T-shaped faces opposite one another, a first face 30 appearing at the front of FIG. 2 and a second face 32 appearing at the rear.

The lower platform 26 has a first width L1, whereas the upper platform 28 has a second width L2 greater than the first, and the container 24 has a depth P. The first width L1 is preferably between 1200 mm and 1700 mm, for example 1600 mm, and the second width L2, preferably between 2300 mm and 2700 mm, for example 2438 mm. The depth P of the container 24 is advantageously between 1000 mm and 1700 mm, and is for example 1534 mm. Furthermore, the upper platform 28, parallel to the lower platform 26, is separated therefrom by a distance h of between 400 mm and 600 mm, and for example 584 mm, for an overall container height of 1168 mm.

Also, inside the container 24, locations 34 are formed, partitioned or not partitioned and emerging respectively in the first and second faces 30, 32. Thus, in the example presented in FIG. 2 the container 24 has 2×5 lower locations and 2×8 upper locations emerging respectively in the first and second faces 30, 32.

As will be explained hereinbelow, each location 34 is thus suitable for receiving a piece of luggage, and consequently, the container 24 can accommodate 26 pieces of luggage.

There are also containers of larger size with flats cut for jumbo jets. These containers have three levels. Their width is 1534 mm, while their height is 1626 mm and their length is 2007 mm. Yet others, with these same dimensions apart from the length, have a length of 2337 mm.

Figure 3:
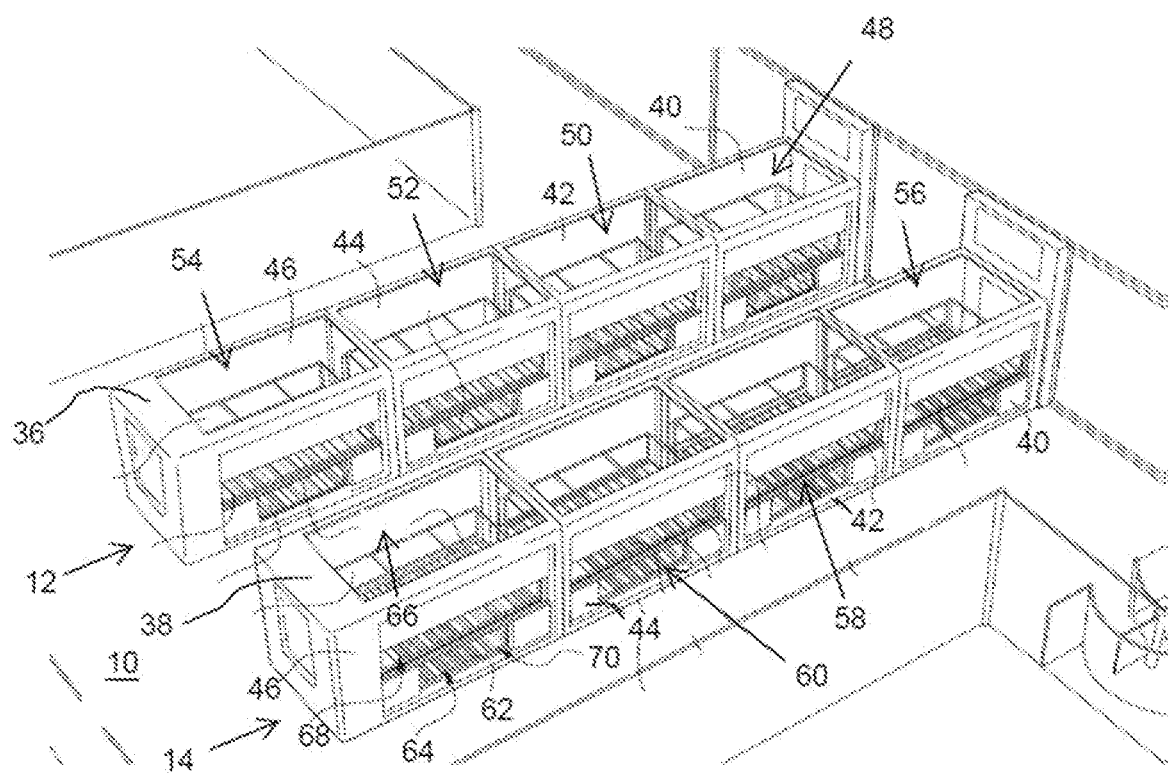
FIG. 3 is a perspective schematic view showing the subject of the invention installed in the part of the airport illustrated in FIG. 1.

Reference will now be made to FIG. 3 which shows the part 10 of the airport and in which the longitudinal storage spaces 12, 14 are respectively covered by two tunnel-forming tubular frames 36, 38.

These two tubular frames 36, 38 are respectively composed of four successive segments 40, 42, 44, 46. Obviously, different tubular frames are envisaged having fewer or greater numbers of different segments.

In FIG. 3, these four successive segments respectively receive containers 48, 50, 52, 54 and 56, 58, 60, 62, of the type of container 24 illustrated in FIG. 2. For this, the containers are engaged successively in a row, from the outside, through the openings 18, 20 and bearing on the first motor cylinders, so that they can be driven therein by translation. So, the last containers to enter drive the ones before them.

Also, each of the segments 40, 42, 44, 46 has two opposing lateral openings 64, 66, respectively divided into a wide upper opening 68 and a narrow lower opening 70. The wide upper opening 68 is freely opened toward the narrow lower opening 70.

The width of the narrow lower opening 70 corresponds substantially to the first width L1 of the lower platform 26 of the container 24, whereas the width of the wide upper opening 68 corresponds substantially to the second width L2 of the upper platform 28.

Also, the wide upper opening 68 extends on each side of the narrow lower opening 70 by the same amplitude. Also, the height of the wide upper opening 68 and narrow lower opening 70 is substantially equal to the distance h separating the two platforms 26, 28 in the vertical direction.

It will be observed that each of the containers 48, 50, 52, 54 and 56, 58, 60, 62 is housed in a segment and that, for each of them, the upper platform 28 coincides with the wide upper opening 68 of the lateral openings 64, 66, while the lower platform 26 coincides with the narrow lower opening 70. And, more generally, for each of the containers 48, 50, 52, 54 and 56, 58, 60, 62, the five locations 34 delimited by the lower platform 26 emerge opposite the narrow lower opening 70, while the eight locations 34 delimited by the upper platform 28 emerge opposite the wide upper opening 68.

Figure 5:
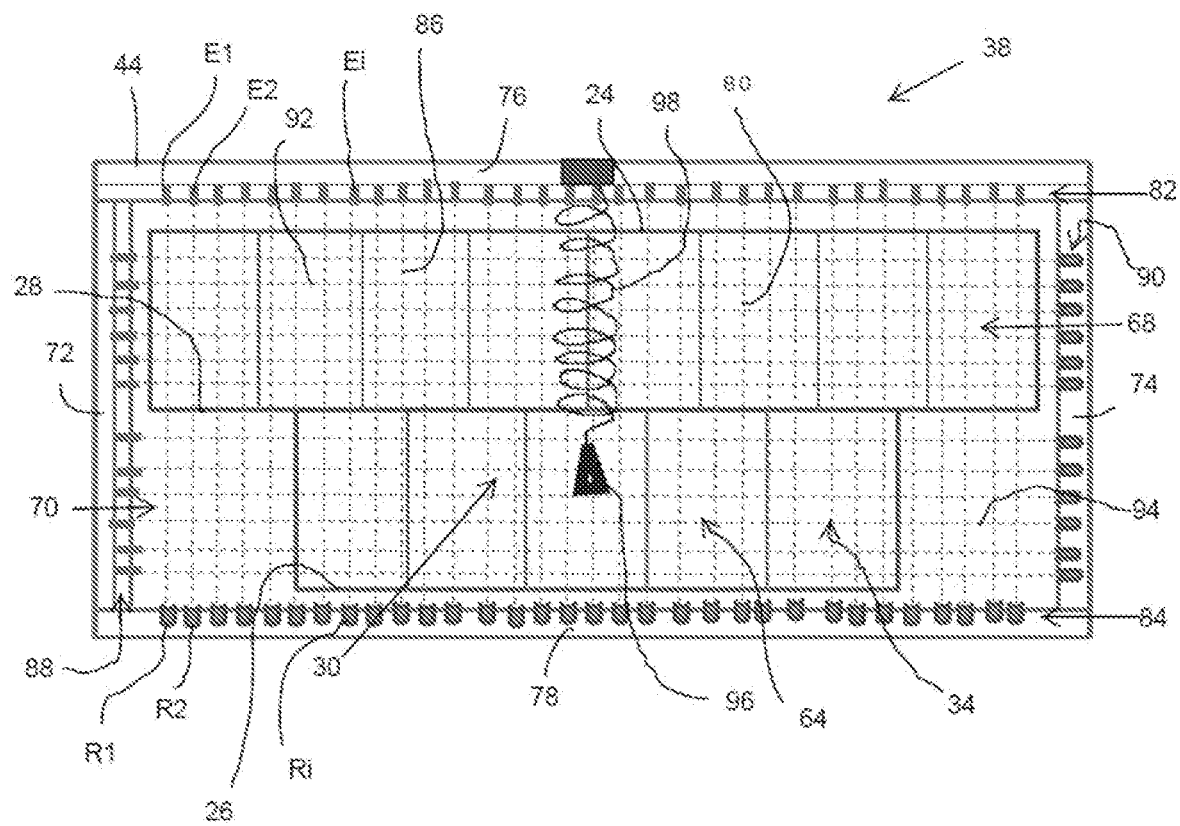
FIG. 5 is a front schematic view of an element of the invention as represented in FIG. 3; and, FIG. 6 is a block diagram illustrating the operation of the invention.

Reference will now be made to FIG. 5 illustrating in detail and by a front view, a lateral opening 64 of one of the tubular frames 38, and more specifically of one of the segments, 44 for example. Behind this lateral opening 64 can be seen the container 24 and its first face 30. Also therein are the locations 34 all emerging opposite the opening 64. The second face of the container 24, opposite the first face 30, for its part, extends opposite the opposite lateral opening of the tubular frame 38.

Each segment 40, 42, 44, 46 has, around each of its lateral openings 64, two parallel uprights, one left 72 and one right 74, linked together by a top crossmember 76 opposite a bottom crossmember 78. The uprights 72, 74 and the crossmembers 76, 78 form a framework in the opening of which is installed a photoelectric detection grid 80.

Thus, the top crossmember 76 comprises a top row 82 of $E_n$ emitters, while the bottom crossmember 78 comprises a bottom row 84 of $R_n$ receivers. Each emitter $E_i$ of the top row 82 is oriented toward a single corresponding receiver $R_i$ of the bottom row 84, such that the optical axes of the emitter $E_i$ and of the receiver $R_i$ coincide. That way, in this particular case, thirty two parallel and vertical beams 86 are obtained, represented by broken lines in FIG. 5. The vertical parallel beams 86 extend substantially regularly from one upright 72 to the other 74. They are, for example, spaced apart from one another by a distance close to 80 mm.

Furthermore, one of the uprights 72 is equipped with a lateral row 88 of $E_m$ emitters, while the other upright 74 is equipped with a lateral row 90 of $R_m$ receivers. Each emitter $E_i$ of the lateral row of emitters 88 is oriented toward a single receiver $R_i$ of the lateral row of receivers $R_i$ 90, such that their optical axes respectively coincide. That way, and in this particular case, six horizontal upper parallel beams 92 are obtained, extending opposite the wide upper opening 68 and represented by broken lines in FIG. 5 and six horizontal lower parallel beams 94 are obtained, extending opposite the narrow lower opening 70. The horizontal beams 92, 94 extend substantially regularly from the top crossmember 76 to the bottom crossmember 78.

That way, opposite each of the locations 34 and in line with the lateral opening 64, statistically, four distinct vertical beams and six distinct horizontal beams cross. That way, and as will be explained hereinbelow, when a passenger carrying a piece of luggage operates at a location 34, he or she necessarily forms an obstacle to part of the 4×6 corresponding crossed beams.

Moreover, the top crossmember 76 is provided with a transmission housing to which an optical reader 96 is connected by means of an extendible link 98.

Figure 6:
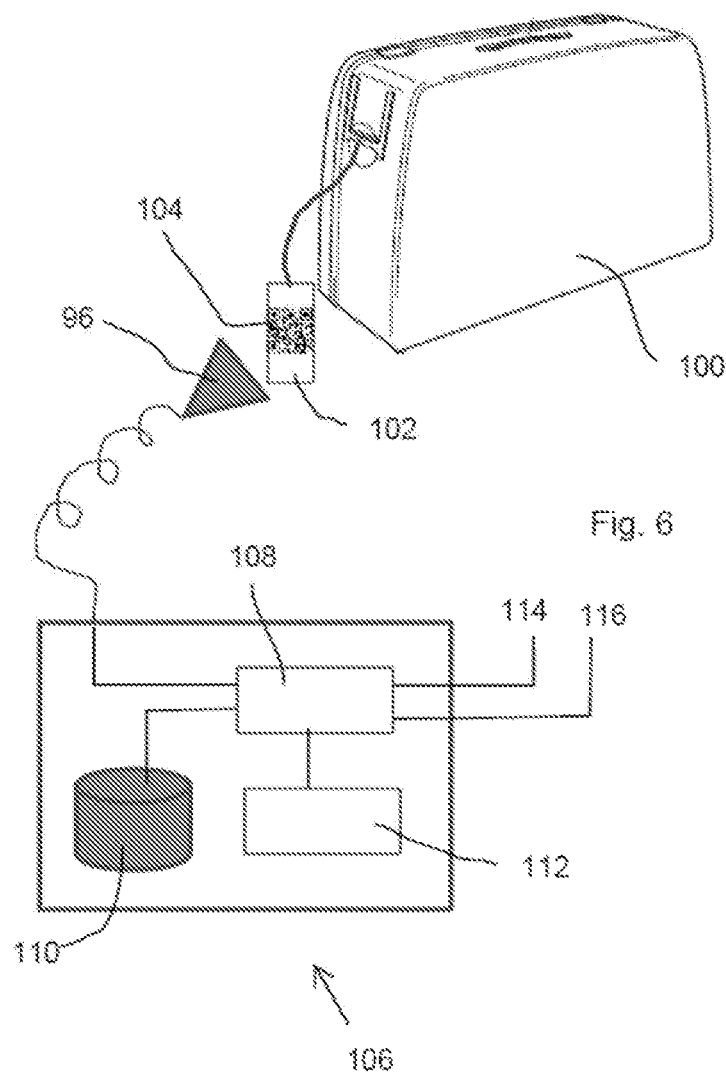

So, reference will now be made, in addition to FIG. 5, to FIG. 6 which shows, schematically, a piece of luggage 100 to which a label 102 forming an information medium is attached. On the label 102, a QR code 104 is printed, including information relating to the piece of luggage, that is to say intrinsic to the carrier of the piece of luggage and his or her destination. This figure also shows an inspection and control system 106. The latter includes a recording member 108, a database 110 and a control member 112. Furthermore, the inspection and control system 106 is linked, on the one hand, by a first line 114 to the top 82 and bottom 84 rows of emitters and of receivers, and, on the other hand, by a second line 116 to the lateral rows of transmitters 88 and of receivers 90, represented in FIG. 5. In addition, the optical reader 96 is also linked to the inspection and control system 106 via the abovementioned transmission housing.

That way, a passenger provided with his or her piece of luggage, recorded and having satisfied the inspection zone, is routed to one 38 of the tubular frames 36, 38 and stands in front of the lateral opening 64 of the segment 44 represented in detail in FIG. 5. He or she for example carries his or her piece of luggage 100 into the third location 34 starting from the left upright 72, on the upper platform 28. To do this, he or she carries his or her piece of luggage through the photoelectric detection grid 80, and breaks the vertical 86 and horizontal 94 beams that correspond specifically to this third location. This information on the position of the location is then transmitted to the recording member 108 via first 114 and second 116 lines. In parallel, the passenger grasps the optical reader 96 and once again crosses the photoelectric detection grid 80 opposite said location to read the QR code 104. Consequently, concomitantly with the reception of the position information, the recording member 108 receives the information relating to the pieces of luggage and associates it with them. That way, the position of the piece of luggage in the container 24, and the carrier identification information are recorded in the recording member 108. It is thus possible to check that the deposited piece of luggage does indeed correspond to the flight for which it has been recorded. They will then be able to be transmitted to a destination airport so that the passenger can identify and remove his or her piece of luggage, as will be explained hereinbelow.

However, if the abovementioned sequence, that is to say crossing the photoelectric detection grid 80, then reading a QR code, were not observed, then, the control member 112 would actuate an alarm. Such circumstances might arise for example from the prior reading of the QR code before any crossing of the photoelectric detection grid 80. Or even from the reading of a QR code and a correlation thereof with a location previously recorded. In these conditions, an agent present on site could intervene to check that the piece of luggage is not suspect.

Furthermore, the system makes it possible to manage the cases where the passenger crosses the photoelectric detection grid 80 by means of an optical reader 96 to read his or her code, without having cleared the photoelectric detection grid 80 first and, in cases where he or she clears it, when the optical reader 96 is too far away from it. In the latter case, a timer is for example triggered between the instant when the grid 80 ceases to be crossed and in which it is once again crossed at the same point to read the code. Thus, an alarm is triggered when the timer expires without the code having been recorded.

Also, particularly advantageously, the database 110 is loaded with the information relating to all the pieces of luggage likely to be deposited. Consequently, each time a QR code is read by means of the optical reader 96, a check is made with the information in the database 110. If the read does not correspond to any of the recorded passengers the control member 112 would also actuate the alarm. In the event of an error concerning the place of deposition of the piece of luggage, the system could advantageously guide the passenger to the correct place of deposition.

Such a database 110 also makes it possible to check that all the pieces of luggage deposited correspond to passengers effectively embarked, to identify the pieces of luggage for which there is no correspondence with an embarked passenger, and the location and the container. Furthermore, the database 110 makes it possible to check, if necessary, that all the passengers who have satisfied the upstream inspection step, and for whom the piece of luggage has indeed been recorded and equipped with its information medium, have deposited their pieces of luggage in the containers 24.

Each of the locations 34 of all the containers 24 are filled with luggage according to the abovementioned sequence. Or at the very least, most of these locations 34 are loaded with luggage. Next, the containers 24 are extracted longitudinally from the tubular frames to be able to be loaded into an aeroplane. Then, the aeroplane makes its flight to the destination with the passengers on board.

Figure 4:
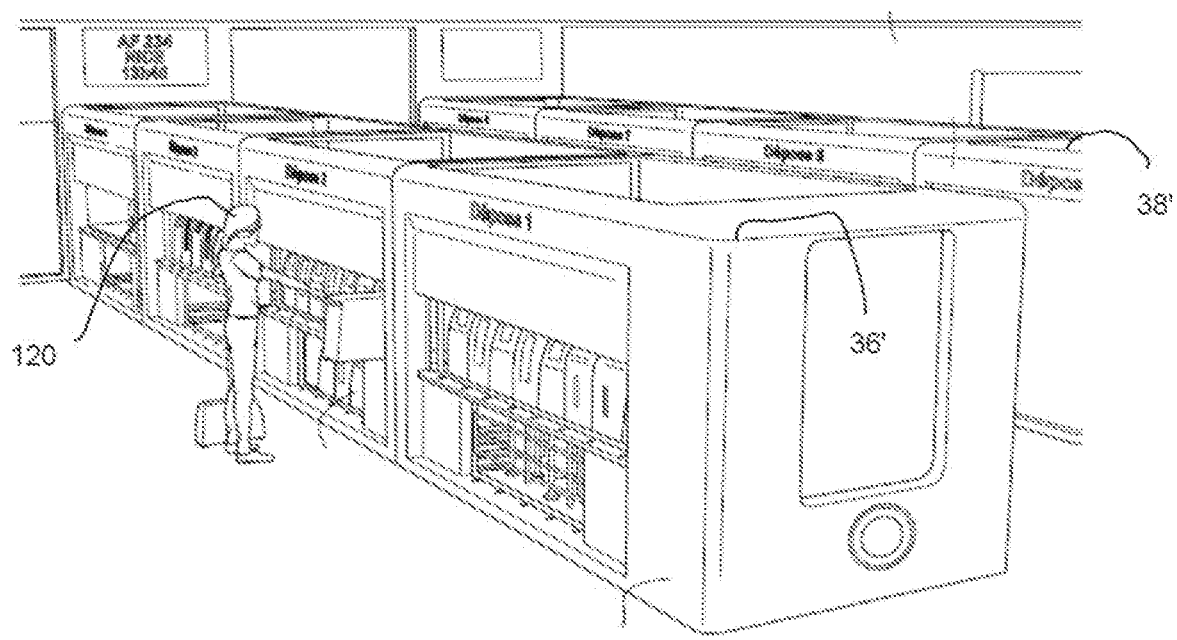
FIG. 4 is a perspective schematic view of an installation similar to that represented in FIG. 3.

At destination, the luggage containers are offloaded from the aeroplane and are engaged in tubular frames 36', 38' of the destination airport that appears in FIG. 4. These tubular frames 36'; 38' are identical to those of the departure airport. And, the containers 24 are engaged therein according to an identical configuration. That way, the passengers 120 can then easily retrieve their piece of luggage, that they extract from the locations of the containers.

If the passenger has forgotten the position of the location of his or her piece of luggage, the passenger can retrieve it by presenting his or her QR code for reading by any mobile reader corresponding to the flight. Once he or she is in front of the right container, a new read of the QR code releases the piece of luggage. Any attempt to remove the piece of luggage without prior release by the reading of the QR code triggers an alarm.

The invention claimed is:

1. Luggage inspection installation comprising:
a tubular frame comprising a plurality of pairs of opposed lateral openings, said tubular frame being suitable for accommodating a plurality of successive containers in line respectively with the pairs of lateral openings, each of said containers having two opposing faces and a plurality of juxtaposed and superposed locations that are freely accessible through said two opposing faces, each of said locations being suitable for receiving a piece of luggage provided with an information recording medium containing information relating to said piece of luggage;
a locating device and a reading device linked to a recording member to be able to record, for each of said locations of each container receiving a piece of luggage, a position of said location in said container and said information relating to said piece of luggage;
wherein said locating device comprises photoelectric detection grids installed respectively across the lateral openings of the plurality of pairs of opposed lateral openings, and in that the position of said location in said container is recorded when the photoelectric detection grid is crossed opposite said locations and said reading device reads said information recording medium.

2. The inspection installation as claimed in claim 1, wherein said photoelectric detection grids comprise a plurality of first parallel electromagnetic beams and a plurality of second parallel electromagnetic beams crossed with the first beams.

3. The inspection installation as claimed in claim 2 wherein the first electromagnetic beams of the plurality of first parallel electromagnetic beams extend vertically, whereas the second electromagnetic beams of the plurality of second parallel electromagnetic beams extend horizontally.

4. The inspection installation as claimed in claim 1, wherein said reading device is mobile so as to be able to be carried, by a luggage carrier, opposite said information recording medium of said piece of luggage to read said information recording medium.

5. The inspection installation as claimed in claim 1, wherein said reading device is an optical reader.

6. The inspection installation as claimed in claim 5, wherein said information recording medium supports coded information.

7. The inspection installation as claimed in claim 6, wherein said information recording medium supports a matrix code.

8. The inspection installation as claimed in claim 1, wherein said recording member provokes the triggering of an alarm when the recording member records just the crossing of the photoelectric detection grid opposite said location without recording said information relating to said piece of luggage.

9. The inspection installation as claimed in claim 1, wherein said reading device provokes the triggering of an alarm when said recording member records said information relating to said piece of luggage before recording the crossing of the photoelectric detection grid.

10. The inspection installation as claimed in claim 1, wherein said recording member includes a prerecorded list of the information relating to all the pieces of luggage, and in that said recording member compares the information relating to each piece of luggage received in each of the locations to the information relating to the pieces of luggage of said prerecorded list.

* * * * *